United States Patent [19]

Skibowski

[11] Patent Number: 4,817,662
[45] Date of Patent: Apr. 4, 1989

[54] SHUT-OFF VALVE

[75] Inventor: Hubert Skibowski, Hamburg, Fed. Rep. of Germany

[73] Assignee: Dover Corporation, New York, N.Y.

[21] Appl. No.: 67,710

[22] Filed: Jun. 26, 1987

[30] Foreign Application Priority Data

Jun. 28, 1986 [DE] Fed. Rep. of Germany ....... 3621746

[51] Int. Cl.4 .............................................. F16K 5/04
[52] U.S. Cl. .................................... 137/312; 251/309
[58] Field of Search ................. 137/312; 251/309, 314

[56] References Cited

U.S. PATENT DOCUMENTS

| 3,133,722 | 5/1964 | McGuire et al. | 251/309 |
| 3,314,644 | 4/1967 | Dwyer et al. | 251/309 |
| 3,423,067 | 1/1969 | Foster | 251/309 |
| 3,667,504 | 6/1972 | Wittren et al. | 251/900 X |
| 4,261,385 | 4/1981 | Worley | 137/340 |

FOREIGN PATENT DOCUMENTS 3246622 11/1986 Fed. Rep. of Germany .
548631 10/1942 United Kingdom .

Primary Examiner—Gerald A. Michalsky
Attorney, Agent, or Firm—Kinney & Schenk

[57] ABSTRACT

Shut-off valve comprising a casing which has at least two connections, one shut-off element rotatably supported in the casing having a thru bore which selectively can be aligned with the connections and an outer cylindrical surface, and a cylindrical annular sealing sleeve of elastic material which is blocked against rotation in the casing which has thru bores adapted to be aligned with the connections, the sleeve sealing by cooperating with the cylindrical surface of the shut-off element and being axially held in place at its outer edge surfaces by the casing, whereby in the outside of the sealing sleeve being made of PTFE or like material around the thru bore a groove is formed into which an elastic sealing ring is placed, the diameter of which is larger than the depth of the groove.

6 Claims, 1 Drawing Sheet

SHUT-OFF VALVE

The invention refers to a shut-off valve comprising a casing which has at least two connections, a shut-off element rotatably supported in the casing, the shut-off element having a thru bore which selectively can be aligned with the connections and an outer cylindrical surface, a cylindrical annular sealing sleeve made of elastic material which is blocked against rotation in the casing, has thru bores adapted to be aligned with the connections, the sleeve sealingly cooperating with the cylindrical surface of the shut-off element and being axially held in place at its outer edge surfaces by the casing.

Such a shut-off valve is known from GB-PS No. 548 631. Rings made of metallic material are located in the thru bores of the sleeve to limit the opening width. By using a cylindrical shut-off element a dead space to a large degree can be avoided into which the working medium could penetrate. In the known shut-off valve the sealing sleeve is compressed by means of a cover-like disc whereby extraordinarily high contact forces can occur at the respective surfaces of shut-off element and casing, although a satisfactory sealing is not achieved. The friction force is to a large degree depending on the contact force so that a satisfactory sealing force can be achieved only by high contact forces which prevent an actuation of the shut-off element with normal forces. Furthermore it is difficult to incorporate the metallic rings in the sealing sleeve in such a way that a step-like change over to the thru bore of the shut-off element respectively the connections can be avoided.

It is also known from De-Os No. 32 46 622 to use an annular cylindrical layer of elastomeric material between shut-off element and casing, the material being compressible in axial direction. A second annular layer of sealing material, preferably PTFE, borders upon the first layer from the in- or outside. With the aid of the axially compressible annular layer a radial pressure on the bearing layer can be exerted on its total axial length. Thus, the bearing layer is pressed against the corresponding surfaces of shut-off element and casing and causes an effective sealing. The compressible material can swell in contact with certain media. Thereby the pressure at the shut-off element can rise to an undesired degree.

The object of the invention is to create a shut-off valve which is simply structured and easy running to operate and after all leads an to an effective sealing from inward to outward and vice versa.

This problem is solved in that in the outer surface of the sealing sleeve made of PTFE or such material an annular groove is formed around the thru bore. An elastic sealing ring is placed in the groove, the diameter of which being larger than the depth of the groove.

While in the known shut-off valves as described above two layers or sleeves, respectively, enclose the cylindrical shut-off element, the shut-off valve according to the invention has only one sealing sleeve which preferably consists of PTFE (Polytetrafluorethylen). At the outer side of the sealing sleeve a groove is formed around the thru bore to hold an elastic sealing ring, the diameter of which being dimensioned larger than the depth of the groove. Because of the biasing of the sealing ring the sealing sleeve is pressed against the cylindrical outer surface of the shut-off element by means of which an effective sealing is achieved.

As the material of the sealing sleeve is subject to expansion, respectively, shrinking caused by heat, it is appropriate not to let the shut-off element press too strongly in radial direction against the sealing sleeve. In any case the sealing force around the groove is sufficient to prevent the penetration of the medium into the sealing area when the valve is open. As explained above it is not necessary either to make the tolerances of the sealing sleeve too tight during production. Beside extraordinarily good sealing properties a relatively small friction between shut-off valve and sealing sleeve is achieved which permits easy operation by manual or power drive. In case of power drive the dimension of the motor can be chosen accordingly small.

In case of the primary seal becoming leaky for some reason, the pressure will extend in both directions. Therefore an embodiment of the invention takes provision that in the outer edge areas of the sealing sleeve an axial groove is formed and an elastic sealing ring is placed into the groove, the diameter of which being larger than the width of the groove. In this embodiment of the invention the elastic sealing ring spreads apart the edges of the sealing sleeve to form an effective barrier which prevents the flow of the medium into the casing or outwards, respectively, and the inward penetration of contaminants into the medium.

In an additional embodiment of the invention is it considered to have sealing rings made of soft elastic material with a layer of PTFE. The PTFE layer provides for a satisfactory durability of the sealing ring independent of the medium in operation. As PTFE is resilient itself, it will accomodate the deformation of the soft elastic material.

It is required for many kinds of use that shut-off valves must not contain any cavities into which the medium in operation can penetrate. For instance this is the case in the beverage and food industry, in the cosmetic industry etc. In the above referenced valve this requirement is fulfilled to a large extent, however, a gap is provided between the lid for compressing the sealing sleeve and the shut-off element. This gap is necessary to enable a relative movement between lid and shut-off element. Thus, in this location a harmful cavity is formed. Therefore an embodiment of the invention provides a counter surface consisting of a plate made of PTFE which is positioned between the shut-off element and the sealing sleeve and the casing. The plates made of PTFE could be pressed against the outer surfaces of the shut-off element and the sealing sleeve, respectively, under a certain axial force without considerable friction forces acting upon the shut-off element in circumferential direction. Furthermore the plates make possible the elimination of any cavities so that a contamination in this area can be excluded.

A further embodiment of the invention provides that a cylindrical ring of PTFE is positioned on at least one outer edge surface of the sealing sleeve having a small axial distance to the sealing sleeve, the cylindrical ring having an axial groove in its front surface opposite to the sealing sleeve, in which a sealing ring of elastomeric material is placed having a diameter larger than the width of the groove and that a case bore terminates in the gap between the sealing sleeve and the cylindrical ring for connecting a leakage indicator. In case the medium passes the barrier at the front areas of the sealing sleeve the leakage can be signaled to the outside by the leakage indicator. The additional sealing ring of PTFE which is spread apart at its margin by another elastomeric ring takes care that the leaking medium escapes through the leakage indicator in a controlled way and that the infiltration of contaminants from outside can be prevented. Different constructive means of forming the shut-off valve can be selected. According to an embodiment of the invention the shut-off element has an annular cylindrical body which is closed on both sides by fitted-in-place frontal lids.

Especially with the above-referred embodiment the shut-off valve according to the invention can be manufactured as a welded construction which is known as an inexpensive way of manufacturing. In total the shut-off valve according to the invention can be made very inexpensively. The shut-off valve according to the invention can be used for any purpose and for any nominal diameter, can be operated with small forces, provides for sufficient sealing and prevents any cavities.

The invention is furthermore explained herebelow by means of drawings.

Before details of the drawings are furthermore explained, it is herewith stated that all the described features themselves or in connection with features of the claims are significant as regards the invention.

Figure 1:
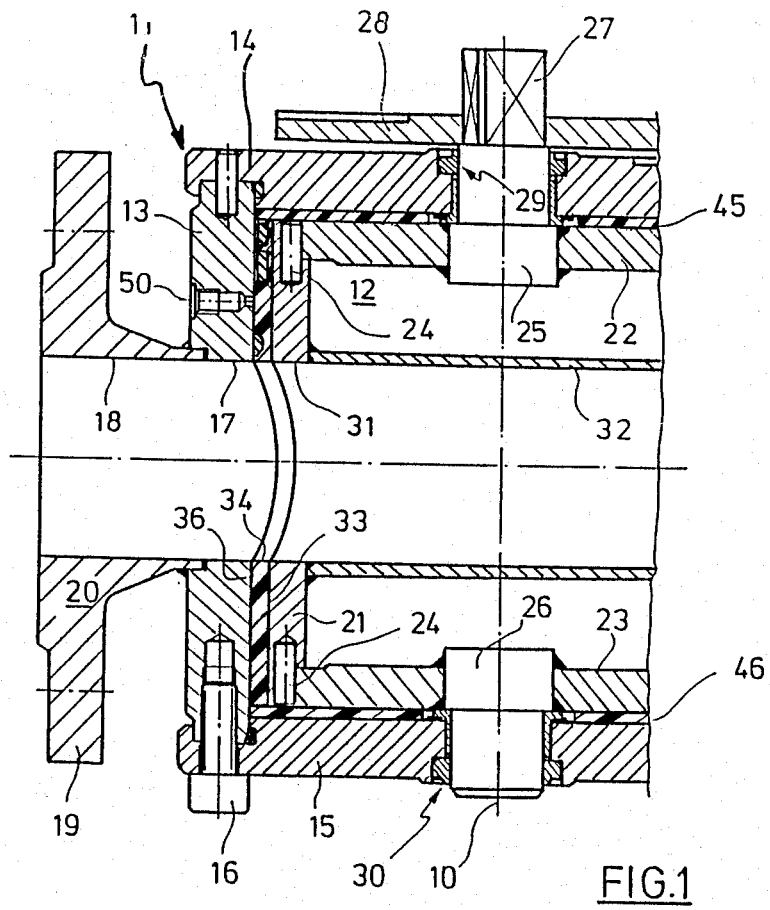
FIG. 1 shows a section through the shut-off valve according to the invention.

The valve shown in FIG. 1 is symmetrical to the axis 10, therefore only one half is shown completely. It contains a casing 11 and a shut-off element 12 which both are furthermore described herebelow.

The casing has a cylindrical outer shell 13 which on both sides is closed by lids 14 and 15. The lids 14 and 15 have annular grooves at their inner sides with the aid of which they overlap the front surfaces of the shell 13. The lids 14 and 15 are firmly screwed with bolts, one of which is shown at 16 to the shell 13. The cylindrical shell 13 has a circle shaped thru bore 17 which is aligned with the thru bore 18 of a connection 20 which is equipped with a flange 19.

The shut-off element 12 has an annular cylinder 21 which is closed on both front surfaces by lids 22 and 23. The lids 22 and 23 are fitted into an annular step at the front surfaces of the annular cylinder 21 whereby adjusting pins 24 and 25, respectively, are provided between the lids 22 and 23 and the annular cylinder 21. Pivots 25 and 26, respectively, are welded in the center of the lids 22 and 23. The pivot 25 extends through an axial opening in the lid 14. At the outer side pivot 25 is shaped as a square bar 27. A plate 28 which limits the rotatory movement is attached to the square bar. The pivot 26 extends through a respective bore in lid 15. Both pivots 25 and 26 form a slide bearing with the lids 14 and 15, whereby a sealing device 29, and 30, respectively, which is not described further provides for the sealing of the pivots 25 and 26.

The annular cylinder 21 has two coaxial circle-shaped thru bores, one of which is shown at 31. At the inner side of the annular cylinder 31 a tube 32 is welded to form a smooth passage through the shut-off element 12. In the shown embodiment a smooth passage with a constant diameter through the valve is shown whereby the valve can also be pigged.

Figure 2:
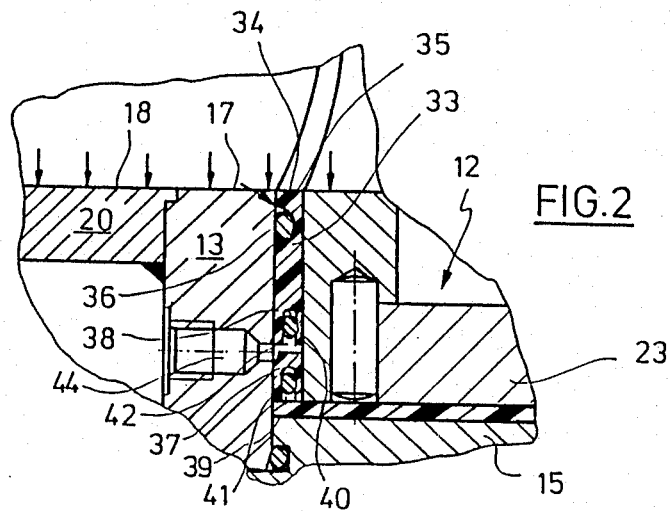
FIG. 2 shows a detail of the shut-off valve according to FIG. 1 at a larger scale.

Between the cylindrical outer side of the shut-off element 12 and the shell 13 a sealing sleeve is positioned which will be furthermore described in FIG. 2. As the position of the sealing sleeve is symmetrical not only to the axis 10 but also to the axis of the passage through the valve, the description according to FIG. 2 will be sufficient to show the complete build-up of the sealing arrangement. Between the annular cylinders 13 and 21 a cylindrical sealing sleeve 33 is positioned. The sealing sleeve 33 consists of PTFE (Polytetrafluorethylen) and is pressed into the bore of the shell 13. It has two opposite openings, one of which is shown at 34. Concentrical to the opening axis a annular groove 35 is formed at the outer side of the sealing sleeve 33. Into the annular groove a sealing ring 36 is positioned, the diameter of which being larger than the depth of the groove 35. The sealing ring 36 is made of elastomeric material, for instance soft elastic material which has a layer of PTFE. Thus, the sealing ring 36 is being deformed during service for which purpose the groove 35 makes way. The counter force for the deformation of the sealing ring 36 is taken by the sealing sleeve 33 so that it will be pressed with more or less force against the annular cylinder 21 of the shut-off element 12. Also the annular cylinder 21 is pressed into the sealing sleeve 33 this being done without high pressure. Even more there is sufficient possibility for turning the ring cylinder 21 in the sealing sleeve 33, whereby the sealing sleeve 33 can be locked against turning by appropriate means, for instance by pins or such.

The sealing sleeve 33 is shorter than the annular cylinder 21. At both outer edge surfaces of the sealing sleeve 33 an annular cylinder 37 is positioned which also consists of PTFE. In both outer edge surfaces of the sealing sleeve 33 as well as in those of the sealing rings 37 there are axial grooves 38 and 39, respectively, in which sealing rings 40 and 41, respectively, are positioned. The diameter of the sealing rings 40 and 41 is larger than the width of the grooves 38 and 39, so that the edges of the sealing sleeve 33 and, respectively, the cylindrical rings 37 are spread apart, forming a seal with the shell 13, and the cylindrical ring 21 of the shut-off element 12. Between the sealing sleeve 33 and the cylindrical ring 37 there is a gap 42 which is in connection with a bore 44 of the shell 13.

Between the lid 14 and the plate 22, and the lid 15 and the plate 23, respectively, there is an annular plate 45 and 46, respectively, made of PTFE, extending to the inner side of the shell 13, upon which the ring cylinders 37 border.

In the open position of the shut-off valve as shown in FIG. 1 the primary sealing formed by the sealing ring 36 provides that the medium does not penetrate between the shell 13 and the sealing sleeve 33 or, respectively, the sealing sleeve 33 and the ring cylinder 21 in order to get outside. In case that anyway some medium should leak, the sealing ring 40 at the outer edge surface of the sealing sleeve 33 forms an effective barrier. Passing leaking medium gets into the gap 42 and can flow outside through the bore 44 in a controlled manner or, respectively, can be detected by a suitable leakage indicator. The cylindrical rings 37 prevent a penetration of the medium to the outside, respectively, they prevent the infiltration of contaminants to the inside. The PTFE plates 45 and 46 enable an easy running of the shut-off element 12 when operated, even when the lids 14 and 15 are pressed on with a certain axial force.

As can be seen, the shown valve can be pigged, whereby the passages 34 in the sealing sleeve 33 can be manufactured by boring after having it put into the casing 11 to provide for a smooth passage.

Between the sealing sleeve 33 and the shell 13 a preset pressure can be built up by a pressure or barring medium. By this means any dead space between the sealing sleeve 33 and the cylindrical body 21 can be avoided, especially when wide tolerances have been used. In the shell 13 between the sealing ring 30 and the upper sealing arrangement a bore 50 is provided which can be connected with the source for a barring medium.

I claim:

1. A shut-off valve comprising a casing having at least two connections, a shut-off element having a cylindrical outer surface and being rotatably supported in the casing, said shut-off element having a thru passage which can be selectively aligned with the at least two connections, a resilient annular cylindrical sealing sleeve being fixed in the casing against rotational movement and having two thru bores adapted to be aligned with the at least two connections, the sealing sleeve co-acting with the cylindrical outer surface of the shut-off element and the casing to provide sealing means, the sealing sleeve being positioned in an axial direction by the casing, a groove (35) being formed in the cylindrical outer surface of the sealing sleeve (33) around both of the thru bores (34) and an elastic sealing ring (36), having a diameter larger than the depth of the groove (35), being placed in each groove, the improvement wherein an axial groove (38) being formed in each outer edge surface of the sealing sleeve (33) and an elastic sealing ring (40), having a diameter larger than the width of the axial groove (38), being placed therein to provide further sealing.

2. The shut-off valve according to claim 1, wherein the sealing rings (36, 40) are made of soft elastic material having a layer of PTFE.

3. The shut-off valve according to claim 1, wherein at least one outer edge surface of the sealing sleeve and the shut-off element engage a counter surface of the casing; the counter surface being formed by a plate (45, 46) of PTFE arranged between the casing (11) and the shut-off element (12).

4. The shut-off valve according to claim 1, characterized in that a PTFE cylindrical ring (37) is located a small axial distance from an outer edge surface of the sealing sleeve (33), the cylindrical ring having an axial groove (39) along an edge surface opposite the sealing sleeve (33) in which ring (41) of elastomeric material, having a diameter larger than the width of the groove, is placed, and a casing bore (44) being provided between the sealing sleeve (33) and the cylindrical ring (37) for attachment of a leakage indicator.

5. The shut-off valve according to claim 1, wherein the shut-off element (12) is closed at both ends by fitted-into-place front lids (22, 23).

6. The shut-off valve according to claim 1, wherein the sealing sleeve is made from PTFE and the like.

* * * * *